(12) United States Patent
Hikmet et al.

(10) Patent No.: US 11,518,095 B2
(45) Date of Patent: Dec. 6, 2022

(54) COLOR MIXING NOZZLE

(71) Applicant: SIGNIFY HOLDING B.V., Eindhoven (NL)

(72) Inventors: Rifat Ata Mustafa Hikmet, Eindhoven (NL); Paulus Albertus Van Hal, Eindhoven (NL); Bert Wouters, Eindhoven (NL)

(73) Assignee: Signify Holding B.V., Eindhoven (NL)

( * ) Notice: Subject to any disclaimer, the term of this patent is extended or adjusted under 35 U.S.C. 154(b) by 0 days.

(21) Appl. No.: 17/048,789

(22) PCT Filed: May 3, 2019

(86) PCT No.: PCT/EP2019/061401
§ 371 (c)(1),
(2) Date: Oct. 19, 2020

(87) PCT Pub. No.: WO2019/215041
PCT Pub. Date: Nov. 14, 2019

(65) Prior Publication Data
US 2021/0114295 A1    Apr. 22, 2021

(30) Foreign Application Priority Data
May 7, 2018  (EP) .................................. 18170978

(51) Int. Cl.
*B29C 64/209*    (2017.01)
*B33Y 10/00*    (2015.01)
(Continued)

(52) U.S. Cl.
CPC .......... *B29C 64/209* (2017.08); *B29C 64/118* (2017.08); *B33Y 10/00* (2014.12);
(Continued)

(58) Field of Classification Search
CPC ... B29C 64/209; B29C 64/118; B29C 64/336; B33Y 10/00; B33Y 30/00; B33Y 70/00; B33Y 40/00; B33Y 80/00; B29K 2101/12
See application file for complete search history.

(56) References Cited

U.S. PATENT DOCUMENTS

| | | |
|---|---|---|
| 2015/0056318 A1 | 2/2015 | Ho |
| 2015/0093465 A1* | 4/2015 | Page .................... B29C 48/0021 425/132 |

(Continued)

FOREIGN PATENT DOCUMENTS

| | | | |
|---|---|---|---|
| CN | 204505858 | * | 7/2015 |
| KR | 101610897 B1 | | 4/2016 |

(Continued)

*Primary Examiner* — Timothy Kennedy
*Assistant Examiner* — Guy F Mongelli (57) ABSTRACT

Printer head (501) for a 3D printer, the printer head (501) comprising n distribution elements (510), wherein n≥2, a combination chamber (520), and a printer nozzle (502), wherein the combination chamber (520) is configured downstream of the distribution elements (510) and upstream of the printer nozzle (502), wherein each distribution element (510) comprise a flow-through chamber (511) with an inlet (512) and a plurality of k outlets (513) to the combination chamber (520), wherein k≥4, wherein the outlets (513) of the distribution elements (510) are configured such that a plurality of outlets (513) of a distribution element (510) have outlets (513) of another distribution element (510) as nearest neighbors.

14 Claims, 6 Drawing Sheets

(51) Int. Cl.
*B33Y 30/00* (2015.01)
*B33Y 70/00* (2020.01)
*B29C 64/118* (2017.01)
*B29K 101/12* (2006.01)

(52) U.S. Cl.
CPC .............. *B33Y 30/00* (2014.12); *B33Y 70/00* (2014.12); *B29K 2101/12* (2013.01)

(56) References Cited

U.S. PATENT DOCUMENTS

2016/0009029 A1   1/2016   Cohen et al.
2021/0039306 A1*  2/2021   Busbee ................ A43B 13/026

FOREIGN PATENT DOCUMENTS

| WO | 2014151809 | A2 | 9/2014 |
| WO | 2015188017 | A1 | 12/2015 |
| WO | 2016055223 | A1 | 4/2016 |
| WO | 2017009646 | A1 | 1/2017 |
| WO | 2017099645 | A1 | 6/2017 |

* cited by examiner

COLOR MIXING NOZZLE

CROSS-REFERENCE TO PRIOR APPLICATIONS

This application is the U.S. National Phase application under 35 U.S.C. § 371 of International Application No. PCT/EP2019/061401, filed on May 3, 2019, which claims the benefit of European Patent Application No. 18170978.3, filed on May 7, 2018. These applications are hereby incorporated by reference herein.

FIELD OF THE INVENTION

The invention relates to a printer head for a 3D printer, especially (for) a FDM 3D printer. Yet further, the invention also relates to a 3D printer comprising such printer head. The invention relates to a method for manufacturing a 3D (printed) item. The invention also relates to the 3D (printed) item obtainable with such method.

BACKGROUND OF THE INVENTION

Different types of material dispensing systems are known in the art. US2015/0093465, for instance, describes a material deposition system comprising an extruder for deposition materials, the extruder comprising two or more material entry ports, a mixing chamber, and an exit orifice; and a controller coupled with the extruder, the controller configured and arranged to dynamically change delivery rates of the deposition materials to be mixed in the mixing chamber before flowing from the exit orifice; wherein the controller combines a desired volume flow rate of material to flow from the exit orifice with a mix ratio to specify the delivery rates of the deposition materials.

WO2014/151809 discloses a fabrication device with an extruder configuration into which three or more colored materials are fed from a source. The extruder configuration has a printing tool head with a chamber and a nozzle. The extruder configuration operates by blending separate molten colored plastic filament material in a narrow melting chamber and extruding the mixture through a smaller bore within the printing tool head. As material in the chamber is pushed into the nozzle, the colored filament is further mixed into the desired color through resistance in the channel until it is finally deposited outside the nozzle onto the object being printed.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerisable material which is cured after each deposition to form a solid structure. While this technique produces smooth surfaces the photo curable materials are not very stable and they also have relatively low thermal conductivity to be useful for injection molding applications.

The most widely used additive manufacturing technology is the process known as Fused Deposition Modeling (FDM). Fused deposition modeling (FDM) is an extrusion-based additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three-dimensional object. FDM printers are relatively fast, low cost and can be used for printing complicated 3D objects. Such printers are used in printing various shapes using various polymers. The technique is also being further developed in the production of LED luminaires and lighting solutions.

It has been demonstrated that FDM can be used for producing various types of luminaires such as spots and down lights and decorative lamp shades. In some applications it is also interesting to produce effect such as color variations, but it might be also interesting to induce gradient in transmission. It may also be desirable to induce any color, scattering properties uniformly in a print without the need to have many filaments with different properties (color, scattering) on stock. Further, it may be desirable to vary physical and/or chemical properties of the 3D printed material such as magnetic, electrical, mechanical (modulus, strength etc.), thermal conductivity, expansion coefficient, other optical such as IR and UV. Mixing on a molecular level with polymers appears to be very difficult or even impossible and would at least involve rigorous active mixing which is difficult to realize in an FDM printer. Such variation may be within the same 3D printed item but may also between different items (printed with the same 3D printer).

Hence, it is an aspect of the invention to provide an alternative 3D printer head, an alternative 3D printer, an alternative 3D printing method, and/or an alternative 3D (printed) item which preferably further at least partly obviate(s) one or more of above-described drawbacks. The present invention may have as object to overcome or ameliorate at least one of the disadvantages of the prior art, or to provide a useful alternative.

Here we suggest a mixing strategy where the mixing is essentially not on a molecular level, but the (different) 3D printed materials may be placed in small regions, which are distributed in volume, but also on the surface. When e.g. different colors are used, this may be such that the observer sees the average effect (color). For this purpose, it is herein suggested using multi-channel mixing heads. In embodiments, the head is made of two (or more) regions with its own inlets. From these regions the materials are guided via channels to a "shower head" where two (or more) (different) materials exit from the openings of the "shower head", in embodiments in an (spatially) alternating fashion. From the shower head the materials are squeezed into a single exit tube with especially a smaller diameter than of the shower head reducing the size of the regions to be printed in an FDM equipment. Amongst others, the shower head appears to give good results for (light) transparent materials, for translucent materials, and also for colored light non-transparent materials. Variations on the shower head are herein also proposed.

Hence, in a first aspect the invention provides a printer head for an extrusion-based 3D printer, the printer head comprising n distribution elements, wherein especially n≥2, a combination chamber, and a printer nozzle, wherein the combination chamber is configured downstream of the distribution elements and upstream of the printer nozzle, wherein each distribution element comprise a flow-through chamber with an inlet for a 3D printable material (such as a filament of 3D printable material) and a number of k outlets, especially a plurality of k outlets, to the combination chamber, wherein k≥1, especially k≥2, even more especially ≥4, each distribution element being arranged to distribute the 3D printable material by the plurality of k outlets, wherein in specific embodiments the outlets of the distribution elements are configured such that a plurality of outlets of a distribution element have outlets of another distribution element as nearest neighbors. This does not exclude that some outlets may also have an outlet of the same distribution element as (other) nearest neighbor.

With such printer head, it is possible to combine different printable materials, such as 3D printable material having different properties, such as optical (refractive index, color, scattering, transmission (for UV, visible and IR radiation)), magnetic, electrical, mechanical (modulus, strength etc.), thermal conductivity, expansion coefficient, etc.

When reflective colors need to be combined, it appears to be desirable that (the end result of the) mixing is at a scale below the resolution of the human eye, such as at 30 cm distance from the 3D printed product, which is about 100 μm. For other materials mentioned (i.e. for other properties) above, and/or when the observation is at a larger distance, the domain size may be larger.

The invention may especially be of relevance for application of (3D printed) materials that lead to domains having surface properties that lead to different optical effects. This may apply e.g. to different (3D printed) materials having different reflective colors, but this may also relate to different (3D printed) materials having different reflectivities for the same light, or different (3D printed) materials having different surface roughnesses. As will be understood, the phrase "application of (3D printed) materials" and similar phrases imply that (3D printable) materials have been deposited to provide these (3D printed) materials. Herein, the term "reflective color" and similar terms especially refer to materials that have a color which is defined by its reflection and which material is essentially not transmissive. An example of a material having a reflective color may be a colored paint; an example of a transmissive color is a colored glass window.

Hence, in order to observe a mixed layer at such a distance, the regions in the printed layer in the printed item should be below the resolution of human eye. With prior art methods, it appears that the distribution of the material is not well, and/or is not controlled, and/or depends upon the printing direction. With the present printer head, one or more of these effects can be avoided. Further, color differences between different 3D printable materials or other differences in optical properties, may essentially not be visible. For instance, this may allow an essentially stepless change from one color to the other color, or from one optical property to another optical property (e.g. from light absorbing to light reflective), etc. Alternatively, or additionally, very precise combinations of materials may be provided, with e.g. the desired color and/or the desired (optical) properties, without the necessity to have all these colors on stock, as they may be provided by subtractive color mixing. This may also apply to materials having other relevant properties that may be combined in the printer head. The necessity to have all intermediate combinations on stock is lifted, as with the printer head, they may be combined over a relative large range of different combination ranges.

However, as indicated above, the printer head may also be used to combine 3D printable materials such that (other) physical and/or chemical properties (of different 3D printable materials; and thus, the resulting 3D printed material) can be tuned. Different 3D printable material with different physical and/or chemical properties may combinedly be deposited with a relative large freedom of combination, leading to a 3D printed material that may have tunable chemical and/or physical properties.

The printer head is especially suitable for an extrusion-based 3D printer, even more especially for a FDM printer. Hence, the printer head may (in embodiments) also be indicated as "FDM printer head".

The printer head comprises n distribution elements. The number n may be one, such as in embodiments wherein some additional mixing of the starting 3D printable material may be desired. However, especially n≥2. The "n distribution elements" may also be indicated as first distribution element, second distribution element.

The distribution element comprises a flow-through chamber with an inlet. The inlet is suitable to receive for 3D printable material. For instance, a filament of 3D printable material may be provided to the inlet. The flow-through chamber can essentially any chamber and may have essentially any shape. Especially, the flow through chamber is configured to facilitate to process of dividing the 3D printable material in sub streams via the plurality of k outlets. The outlets provide directly, or via a channel, access to the combination chamber. In embodiments, for instance the outlets of the flow-through chamber are at the same time inlets for the combination chamber. Hence, the outlets are outlets to the combination chamber. The number of outlets may be 1, but will in general be larger than 1, such as k≥2, even more especially ≥4. For a good combination of the materials, k is at least 4. The term "inlet" may also refer to a plurality of inlets. Hence, a distribution element may comprise a plurality of inlets (to the flow-through chamber). When a plurality of distribution elements is available in the printer head, the number of inlets for each respective distribution element may independently be chosen. In general, the number of inlets will be the same for each distribution element. When applying a plurality of inlets for a distribution element, it may be possible to introduce different 3D printable materials to the distribution element. In such way, even more combinations of materials may be realized.

As indicated above, there is especially a plurality of distribution elements (i.e. n≥2). The plurality of distribution elements may include two or more subsets with different number of k outlets, wherein each subset includes one or more distribution elements. Within the subset, the number of outlets is identical for each distribution element, but this number may differ from one or more other subsets with each one or more distribution elements. In specific embodiments, the number of outlets is identical for each distribution element. In yet other embodiments, when the number of outlets differs for different distribution elements, a ratio between a number of outlets for a distribution element with the largest number of outlets to the number of outlets for a distribution element with the smallest number of outlets may be within the range of 1-4, such as in the range of 1-2. Here, the value of 1 in fact indicates that the number is identical, and the value of 4 indicates that the number of outlets for a distribution element with the largest number of outlets is four times larger than the number of outlets for a distribution element with the smallest number of outlets. Hence, especially, there is a plurality of distribution elements. In principle, the respective distribution elements do not necessarily comprise the same number of outlets.

Many embodiments may include a symmetric arrangement of the outlets with for all distribution elements the same number of outlets. Distribution elements may also be configured in two or more sets of each two or more distribution elements. The distribution elements within the same set may have the same number of outlets.

As indicated above, especially all outlets individually (of all the distribution elements of the printer head) are functionally coupled to the combination chamber. Therefore, the combination chamber is configured downstream of the distribution elements.

The terms "upstream" and "downstream" relate to an arrangement of items or features relative to the propagation of the (3D printable) material from a material providing means (here especially a 3D printable material providing device), wherein relative to a first position within a flow of material from the material providing means, a second position in the flow of material closer to the material providing means is "upstream", and a third position within the flow of material further away from the material providing means is "downstream". Hence, the combination chamber is configured upstream of the printer nozzle.

Therefore, all material that is combined in the mixing chamber reaches the nozzle and is forced out of the printer head via the nozzle. For instance, in embodiments the nozzle is an outlet of the mixing chamber. Especially, the mixing chamber includes a single nozzle.

A 3D printer, however, may include a plurality of printer heads (see also below). The distribution element especially comprises a plurality of outlets and may comprise a single inlet. However, the distribution element may also comprise a plurality of inlets (see also above).

For a good combination of the flows of 3D printable material in the combination chamber, especially the outlets are distributed such that an outlet of a first distribution element is adjacent to an outlet of a second distribution element. The outlets of the different distribution elements may be configured such, that mixing may be optimal.

Especially, a plurality of the outlets of the distribution elements, especially all outlets, are configured in a single plane.

In specific embodiments, the outlets of the distribution elements are configured such that a plurality of outlets of a ("first") distribution element have outlets of another ("second") distribution element as nearest neighbors. For instance, in specific embodiments at least 50% of the total number of outlets of a distribution element has outlets of another distribution element as nearest neighbors, such as at least 80%, like at least 90%. Especially, this may apply to essentially all (i.e. 100%) outlets. Further, especially this may apply for each of the distribution elements, i.e. a plurality of outlets of each respective distribution element has outlets of (at least) another distribution element as nearest neighbors. In specific embodiments all outlets of a distribution element have outlets of another distribution element as nearest neighbors. This may lead to an essentially even distribution of all outlets of the different distribution elements.

Hence, in specific embodiments the outlets of the n distribution elements are configured regularly distributed over an outlet area, wherein the outlet area is configured upstream of at least part of the combination chamber. The outlet area may e.g. be a part of a wall of the combination chamber. It may also be part of an element that partly protrudes into the combination chamber.

Hence, the outlet area may have a central part. Especially for a plurality of the outlets configured most remote from the central part may apply that a plurality of outlets, such as at least 50% of the most remotely configured outlets, have (each) at least a single outlet of another distribution element as nearest neighbor. Hence, especially a substantial number of those outlets that may also have a substantial impact on the domains at the edge of the deposited 3D printed material, i.e. the deposited filament, are configured such that a substantial part of the domains (in the 3D printed material) also alternate.

In further specific embodiments, the outlets may (regularly) be distributed about periphery of a "shape" such as a circle or ellipse. Therefore, in embodiments the outlets of the n distribution elements are configured (regularly) distributed over an ellipse-shaped outlet area. Hence, in embodiment the outlets of the n distribution elements are configured in an arrangement having the shape of an ellipse, such as a circle. The term "ellipse" may refer to circle (focal points are identical) or an ellipse (two focal points). Other shapes than an ellipse-shaped are herein not excluded. For example square, pentagon, hexagon, octagon etc., may also be used, and outlets may be arranged about the periphery of these shapes.

In embodiment, the (cross-sectional) shape of the nozzle may define the arrangement of the n distribution elements. When the nozzle has a circular cross-section, the outlet area may be circular, and the outlets may especially (regularly) be distributed about periphery of circle.

For even a better combination of the streams, the flows of 3D materials of the outlets may be guided to the nozzle. To this end, the shape of the combination chamber, or optional elements in the combination chamber, may facilitate guiding of the 3D printable material out of all outlets (in a controlled way) to the nozzle. Therefore, in embodiments the printer head further comprises a conically shaped element having a base configured between or upstream of the ellipse-shaped outlet area and an apex directed to the nozzle. Especially, the shape of the cross-section of the conically shaped element is essentially the same as of the ellipse-shaped outlet area, i.e. both ring-shaped or both ellipse-shaped. The shape may be the same, the dimensions, however, are not necessarily the same. The combination chamber may also have a conical shape. The conical shaped element may in embodiments have a length of about 20-90% of the height of the combination chamber.

For a good combination, especially a combination of (differently colored) 3D printable materials in such a way that in the 3D printed product it is not easily visible, e.g. at a distance of 30 cm or larger (by the human eye), that different 3D printable materials have been applied, the dimensions of either the outlets or of the nozzle, or of both, may not be too large.

Therefore, it appears to be desirable to have a filament leaving the nozzle with domains containing different materials, with the domains to be as small as possible. This can be achieved either by making size of the holes in the mixing chamber as mall as possible and/or additionally by squeezing the first separated parts into a smaller second nozzle, so that an additional volume reduction is realized. In this way a squeeze factor SF can be defined. The squeeze factor SF may be defined as the ((area of all the holes in the mixing chamber)/(area of the nozzle)=$(A*n*k)/$(nozzle area), where A is the area of a single outlet in the mixing chamber). The squeeze factor is preferably as large as possible, such as at least 5, like at least 10, such as in the range of 5-200. In specific examples, the squeeze factor was 10 and 50.

Besides the distribution of the input filament by the number of k holes, and the additional volume reduction by the squeeze factor, also the printed layer height may be important for the final outer surface layer width of a domain (w1). Further, the layer height is also relevant for determining the size of the domains. The height of the layer may be controlled by setting the distance between the building plate and the nozzle of the printer. For a desired layer height, it is controlled by the speed at which the nozzle moves and the speed of extrusion. Therefore, domain size can be reduced if the layer height is lower than the diameter of the nozzle.

Especially, in embodiments one or more of the outlets and the printer nozzle have an equivalent circular diameter of at maximum 2 mm. In specific embodiments, the outlets have an equivalent circular diameter of at maximum 1 mm. In embodiments, a larger nozzle size may (than 2 mm) also be used.

As indicated above, the combination chamber may essentially have any shape. However, especially the combination chamber also has an ellipse shaped cross-section. Even more especially, the cross-sectional shape of the combination chamber may essentially be the same as cross-sectional shape of the nozzle (see also above). When an ellipse-shaped outlet area is applied, all cross-sectional shapes of the ellipse-shaped outlet area, the combination chamber, and the nozzle, respectively, may essentially be the same. As indicated above, the shape may be the same, the dimensions, however, are not necessarily the same.

The combination chamber may have a cross-section that differs in dimensions over the length of the combination chamber. For instance, the combination chamber may have a conical shape, with the apex e.g. being the nozzle. Hence, the conical shaped element as indicated above may be configured in a conical shaped combination chamber. The space between the conical shaped element and the combination chamber is used to guide the 3D printable material to the nozzle. Herein, the term "cone", and similar terms, may in embodiments also refer to a truncated cone.

For a good combination of the materials, it may be useful applying embodiments of the combination chamber having an average equivalent circular diameter that is larger than an equivalent circular diameter of the printer nozzle, such as in the case wherein the combination chamber has a conical shape with the nozzle at the cone. The equivalent circular diameter (or ECD) of an irregularly shaped two-dimensional shape is the diameter of a circle of equivalent area. For instance, the equivalent circular diameter of a square with side a is $2*a*SQRT(1/\pi)$.

Further, in view of recognizability of the original flows of 3D printable material from the outlets it may be beneficial when the dimensions of the printer nozzle are chosen such that combination of the flows lead to dimensions of domains (of the different 3D printed materials) that are in the order or smaller than the visibility by the human eye at about 30 cm from the 3D printed item (about 100 μm). Therefore, in specific embodiments, such as where the nozzle diameter is selected from the range of 1-2 mm, the squeeze factor SF is especially at least about 10, more especially at least about 50, such as at least 100. Therefore, in specific embodiments the printer nozzle has an equivalent circular diameter of at maximum 200 μm*n*k, even more especially the printer nozzle has an equivalent circular diameter of at maximum 120 μm*n*k, more especially the printer nozzle has an equivalent circular diameter of at maximum 100 μm*n*k, yet even more especially the printer nozzle has an equivalent circular diameter of at maximum 80 μm*n*k, such as at maximum 60 μm*n*k. Especially, this may lead to the desired (small) width (w1) of the domains (see also below).

In embodiments, the k outlets have equivalent circular diameters selected from the range of about 60-200 μm.

More in general, the invention provides in an aspect a combination element especially suitable for combining (different types of) 3D printable materials, comprising n distribution elements, wherein n≥2, a combination chamber, and an opening, such as a nozzle, wherein the combination chamber is configured downstream of the distribution elements and upstream of the opening, wherein each distribution element comprise a flow-through chamber with an inlet (for 3D printable material) and a plurality of k outlets to the combination chamber, wherein especially k≥4, wherein the outlets of the distribution elements are configured such that a plurality of outlets of a distribution element have outlets of another distribution element as nearest neighbors. Such combination elements may be may be configured as sources for a downstream configured combination element. In this way, combination may even be better, as the 3D printable material that is provided to the printer head, may already have been pre-combined. Alternatively, or additionally, this may also allow an even better fine tuning of the desired properties of the 3D printed material as the combination of two (or more) materials may be very well controlled.

The printer head can be used as passive mixing element.

A (specific) 3D printer may be used to provide the 3D printed item described herein. Therefore, in yet a further aspect the invention also provides a fused deposition modeling 3D printer, comprising a printer head as defined herein. The 3D printer may further comprise a 3D printable material providing device configured to provide 3D printable material to the printer head.

Hence, in an aspect the invention provides an extrusion-based 3D printer, such as a fused deposition modeling 3D printer ("3D printer", or "printer" or "FDM printer"), comprising (a) a printer head (comprising the printer nozzle) as defined herein, and (b) a 3D printable material providing device configured to provide 3D printable material to the printer head, wherein especially the fused deposition modeling 3D printer is configured to provide said 3D printable material to a substrate.

The 3D printable material providing device may provide a filament comprising 3D printable material to the printer head or may provide the 3D printable material as such, with the printer head creating the filament comprising 3D printable material. Hence, in embodiments the invention provides a fused deposition modeling 3D printer, comprising (a) a printer head as defined herein, and (b) a filament providing device configured to provide a filament comprising 3D printable material to the printer head, wherein the fused deposition modeling 3D printer is configured to provide said 3D printable material to a substrate More especially, the 3D printable material providing device is configured to provide n 3D printable materials to the n distribution elements, respectively. During use of the apparatus, it is not necessary to use all distribution elements. When there is a plurality of distribution elements, one or more of these distribution elements, such as two, may be used.

Further, in embodiments the 3D printable material providing device may be configured to provide two or more (different) 3D printable materials to the same distribution element. In such embodiments, the 3D printable material providing device is configured to provide k 3D printable materials to the n distribution elements, wherein k≥n.

The composition of the 3D printable material escaping from the nozzle of the printer head for deposition can be controlled by controlling the relative amounts of the different printable materials provided to the different distribution elements. For instance, when the flow rate through the distribution elements is essentially the same, the relative contributions of the different 3D printable materials through the different distribution elements may essentially be the same. This may lead to relative amounts in the 3D printed material that are essentially the same. However, the flow rates may be controlled, such that the relative contributions of the 3D printable materials in the combination chamber, and thus in the 3D printed product, can be controlled. Hence, the (FDM) 3D printer may also be configured to control the relative volumes of 3D printable material that enter the combination chamber (via the respective distribution elements), for instance by controlling the flow rate, such as a volumetric flow rate. Hence, the 3D printer may also include a control system configured to control the relative volumes of 3D printable material that enter the combination chamber. Hence, the flow through the distribution elements may be controlled to control the properties of the 3D printed material.

The printer head may be used to combine two or more different 3D printable materials due to the presence of two or more distribution elements, respectively. The 3D printable material that is provided to a distribution element may in embodiments be the results of an upstream combination of different (3D printable) materials. Hence, upstream of a distribution channel, a further combination element, such as a passive or active mixing element may be configured. There may be one or more combination elements configured upstream of the (two or more) distribution elements. Such combination element may include a printer head as described herein. Hence, in embodiments the fused deposition modeling 3D printer as defined herein may comprise at least two printer heads, wherein the printer nozzle of a first printer head is configured upstream of the inlet of a distribution elements of a second printer head. In embodiments, upstream of each distribution element a combination elements, such as a printer head, may be configured.

Instead of the term "extrusion-based 3D printer" shortly the terms "3D printer", "FDM printer" or "printer" may be used. An example of an extrusion-based 3D printer is a fused deposition modeling (FDM) 3D printer. The printer nozzle may also be indicated as "nozzle" or sometimes as "extruder nozzle".

The printer head and/or 3D printer may especially be used in the herein described 3D printing method.

In yet a further aspect, the invention provides such 3D printing method. The invention especially provides a method comprising 3D printing a 3D item, the method comprising depositing (during a printing stage) m 3D printable materials to provide the 3D item comprising 3D printed material, wherein m is at least 2, the method comprises feeding the m 3D printable materials to at least n distribution elements of the printer head as defined herein of a fused deposition modeling 3D printer, and depositing the 3D printed material.

As indicated above, the printer head may comprise at least two distribution chambers, i.e. n=2. Therefore, in specific embodiments 1≤m≤n. Especially, n is thus at least 2. In an embodiment of the method m=n.

Hence, in embodiments m≥2. Especially, in such embodiments the m 3D printable materials comprise different 3D printable materials. In embodiments, the 3D printable materials may also be the same. In general however, when herein the terms "3D printable materials", "plurality of 3D printable materials" or similar terms are used, they refer to a plurality of different 3D printable materials. 3D printable materials may differ in physical and/or chemical properties, which may be due to the chemistry of the thermoplastic material and/or due to the presence of an additive (see amongst others also below).

It is also possible to feed two different 3D printable materials to one distribution element. In that case the equation above becomes 1≤n≤m, with n especially being at least 2. For instance, it may be possible to provide two (or more) different 3D printable materials to a first distribution element and yet another 3D printable material to a second distribution element.

Note that especially at least two different 3D printable materials are applied, that may be provided to at least two different distribution elements. However, it is not excluded that to one or more of the distribution elements two or more different 3D printable materials are provided. In such embodiment, premixing of the two or more different 3D printable materials in the respective distribution element may take place.

As indicated above, the printer head may especially be used to combine 3D printable materials having different colors and/or different optical properties, as essentially stepless change from one color to the other color, or from one optical property to another optical property, or very precise combinations of materials may be provided, with the desired color and/or the desired optical properties.

Hence, in embodiments wherein m≥2, the m 3D printable materials may be 3D printable materials having different (reflective) colors. In embodiments, the (m) 3D printable materials may comprise different thermoplastic materials.

The term 3D printable material is further also elucidated below, but especially refers to a thermoplastic material, optionally including additives, to a volume percentage of at maximum about 60%, especially at maximum about 30 vol. %, such as at maximum 20 vol. %.

The printable material may thus in embodiments comprise two phases. The printable material may comprise a phase of printable polymeric material, especially thermoplastic material (see also below), which phase is especially an essentially continuous phase. In this continuous phase of thermoplastic material polymer additives such as one or more of antioxidant, heat stabilizer, light stabilizer, ultraviolet light stabilizer, ultraviolet light absorbing additive, near infrared light absorbing additive, infrared light absorbing additive, plasticizer, lubricant, release agent, antistatic agent, anti-fog agent, antimicrobial agent, colorant, laser marking additive, surface effect additive, radiation stabilizer, flame retardant, anti-drip agent may be present. The additive may have useful properties selected from optical properties, mechanical properties, electrical properties, thermal properties, and mechanical properties (see also above).

The printable material in embodiments further comprise particulate material, i.e. particles embedded in the printable polymeric material, which particles form a substantially discontinuous phase. The number of particles in the total mixture is especially not larger than 60 vol. %, relative to the total volume of the printable material (including the particles) especially in applications for reducing thermal expansion coefficient. For optical and surface related effect number of particles in the total mixture is equal to or less than 20 vol. %, such as up to 10 vol. %, relative to the total volume of the printable material (including the particles).

Hence, the 3D printable material especially refers to a continuous phase of essentially thermoplastic material, wherein other materials, such as particles, may be embedded. Likewise, the 3D printed material especially refers to a continuous phase of essentially thermoplastic material, wherein other materials, such as particles, are embedded.

The thus obtained 3D printed material comprises plurality of domains originating from the m 3D printable materials. Even when the 3D printable materials would be essentially the same, it may be possible to discern these domains, as there is no (substantial) molecular mixing in the combination chamber. Yet, the method especially further comprises controlling the dimensions of the domains (which may be visible at the surface of extruded material, especially when the 3D printable materials had different reflective colors) to have a largest width (w1), which is at maximum 200 µm, such as at maximum 120 µm, such as at maximum 100 µm, like at maximum 80 µm, such as at maximum 60 µm. Amongst others, the layer height, which can influence the size (width) of the domains on the surface may also be controlled with the 3D printing speed and/or flow rate of the 3D printed material.

As indicated above, when different reflective colors are applied, it is important that for reflective colors on the surface of the printed layer the different colors are visible, and one or more of the differently colored material are hidden in the 3D printed material. This may be achieved with the herein proposed printer head. Further, especially during printing the conditions are chosen such that the domains are smaller than the layer height of the 3D printed material.

The relative small dimensions of the domains are useful for a good combination of the materials, and may especially be useful when the domains have different (reflective) colors, as in this way subtractive color mixing may be obtained.

As indicated above, the method comprises depositing during a printing stage 3D printable material. Herein, the term "3D printable material" refers to the material to be deposited or printed, and the term "3D printed material" refers to the material that is obtained after deposition. These materials may be essentially the same, as the 3D printable material may especially refer to the material in a printer head or extruder at elevated temperature and the 3D printed material refers to the same material, but in a later stage when deposited. The 3D printable material is printed as a filament and deposited as such. The 3D printable material may be provided as filament or may be formed into a filament. Hence, whatever starting materials are applied, a filament comprising 3D printable material is provided by the printer head and 3D printed.

Herein, the term "3D printable material" may also be indicated as "printable material. The term "polymeric material" may in embodiments refer to a blend of different polymers, but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general, these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature ($T_g$) and/or a melting point ($T_m$), and the printer head action comprises heating the 3D printable material above the glass transition and if it is a semi-crystalline polymer above the melting temperature. In yet another embodiment, the 3D printable material comprises a (thermoplastic) polymer having a melting point ($T_m$), and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures, and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former.

As indicated above, the invention thus provides a method comprising providing a filament of 3D printable material and printing during a printing stage said 3D printable material on a substrate, to provide said 3D item.

Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polycarbonate (PC), Polystyrene (PS), PE (such as expanded-high impact-Polythene (or polyethene), Low density (LDPE) High density (HDPE)), PVC (polyvinyl chloride) Polychloroethene, etc. Optionally, the 3D printable material comprises a 3D printable material selected from the group consisting of Urea formaldehyde, Polyester resin, Epoxy resin, Melamine formaldehyde, thermoplastic elastomer, etc. Optionally, the 3D printable material comprises a 3D printable material selected from the group consisting of a polysulfone.

The printable material is printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc. Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc., or a separate substrate thereon or comprised thereby.

Further, the embodiments in relation to the printer head and 3D printer may also be embodiments of the printer head in the herein described method.

Further, the invention relates to a software product that can be used to execute the method described herein.

The herein described method provides 3D printed items. Hence, the invention also provides in a further aspect a 3D printed item obtainable with the herein described method. Especially, the invention provides a 3D item comprising layers of 3D printed material, the layers comprising a first thermoplastic material and a second thermoplastic material, the second thermoplastic material being different from the first thermoplastic material. In each of the aforementioned layers, the first thermoplastic material and the second thermoplastic material are alternately arranged in domains around a longitudinal axis of the layer. Furthermore, these domains have a largest width of 200 μm or less at an outer surface of the layer. Besides the aforementioned layers, the 3D item according to the further aspect of the invention may also comprise other layers of a 3D printed material, such as layers wherein the 3D printed material only contains one of the first and second thermoplastic materials.

In the 3D item according to the further aspect of the invention, there are two or more subsets of different domains, wherein each subset of domains is related to a distribution element used during 3D printing. In embodiments, two or more domains may have different colors, and wherein the domains have a largest width (w1) at an outer surface of the layer which is at maximum 120 μm, such as at maximum 100 μm, like at maximum 80 μm. As indicated above, there may be two or more subsets of differently colored domains, wherein each subset of domains is related to a distribution element used during 3D printing. There may also be two or more subsets of domains having different optical properties, such as different reflectivity for visible light. Hence, in embodiments, two or more domains comprise different thermoplastic materials and/or have different colors, and the domains have a largest width (w1) which is at maximum 200 μm, such as at maximum 100 μm, like at maximum 120 μm, such as at maximum 80 μm. The term "two or more domains" and similar terms may also refer to a plurality of first domains, second domains, and optionally further domains.

Some specific embodiments in relation to the 3D printed item have already been elucidated below when discussing the method. Below, some specific embodiments in relation to the 3D printed item are discussed in more detail.

As indicated above, in embodiments wherein m≥2, especially the m 3D printed materials may comprise different 3D printed materials, such as PMMA and PC. As also indicated above, in embodiments wherein m≥2, the m 3D printable materials may in embodiments be 3D printable materials having different colors, such as the same thermoplastic materials but having differently colored additives (or one of them has not additive). Combining different 3D printable materials may also be used to tune physical properties and/or chemical properties of the 3D printed material The (with the herein described method) obtained 3D printed item may be functional per se. For instance, the 3D printed item may be a lens, a collimator, a reflector, etc. The thus obtained 3D item may (alternatively) be used for decorative or artistic purposes. The 3D printed item may include or be provided with a functional component. The functional component may especially be selected from the group consisting of an optical component, an electrical component, and a magnetic component. The term "optical component" especially refers to a component having an optical functionality, such as a lens, a mirror, a light source (like a LED), etc. The term "electrical component" may e.g. refer to an integrated circuit, PCB, a battery, a driver, but also a light source (as a light source may be considered an optical component and an electrical component), etc. The term magnetic component may e.g. refer to a magnetic connector, a coil, etc. Alternatively, or additionally, the functional component may comprise a thermal component (e.g. configured to cool or to heat an electrical component). Hence, the functional component may be configured to generate heat or to scavenge heat, etc.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIG. 1d schematically depicts an embodiment; and

The schematic drawings are not necessarily to scale.

DETAILED DESCRIPTION OF THE EMBODIMENTS

Figure 1A:
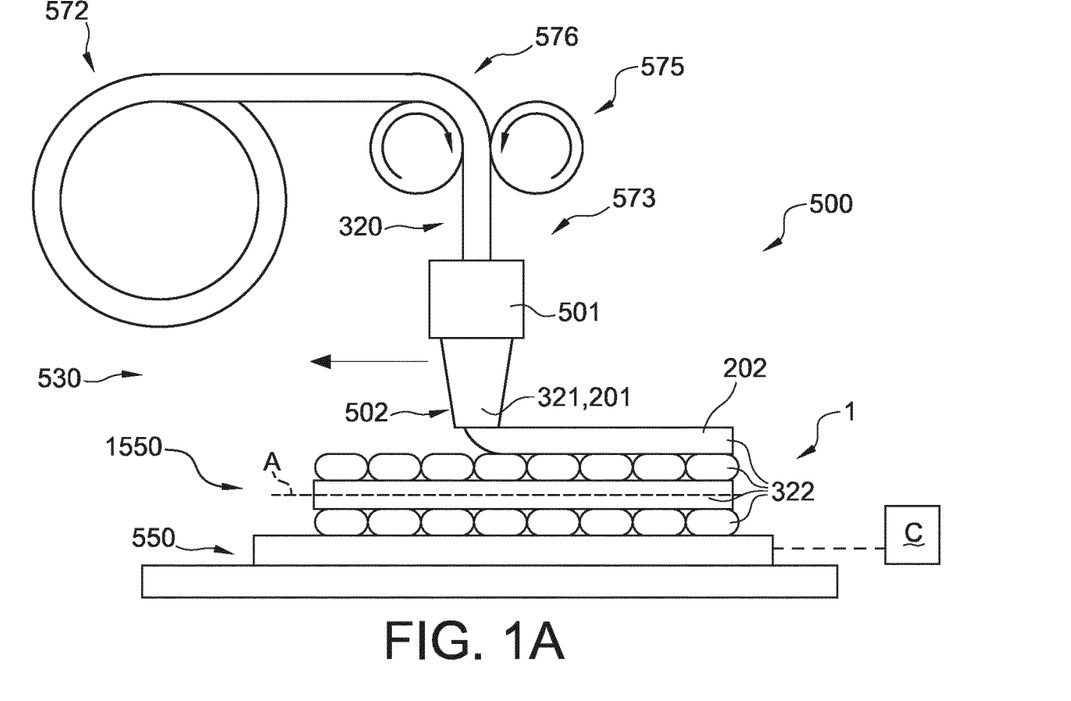
FIGS. 1a-1d schematically depict some general aspects of the 3D printer and of an embodiment of 3D printed material.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as a FDM 3D printer head is schematically depicted. Reference 501 indicates the printer head. The 3D printer of the present invention may especially include a plurality of printer heads, though other embodiments are also possible. Reference 502 indicates a printer nozzle. The 3D printer of the present invention may especially include a plurality of printer nozzles, though other embodiments are also possible. Reference 321 indicates a filament of printable 3D printable material (such as indicated above). For the sake of clarity, not all features of the 3D printer have been depicted, only those that are of especial relevance for the present invention (see further also below).

The 3D printer 500 is configured to generate a 3D item 1 by layer-wise depositing on a receiver item 550, which may in embodiments at least temporarily be cooled, a plurality of filaments 321 wherein each filament 310 comprises 3D printable material 201, such as having a melting point $T_m$. The 3D printable material 201 may be deposited on a substrate 1550 (during the printing stage).

The 3D printer 500 is configured to heat the filament material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as (3D) printed material, which is indicated with reference 202.

Reference 572 indicates a spool or roller with material, especially in the form of a wire, which may be indicated as filament 320. The 3D printer 500 transforms this in a filament 321 downstream of the printer nozzle which becomes a layer 322 on the receiver item or on already deposited printed material. In general, the diameter of the filament 321 downstream of the nozzle is reduced relative to the diameter of the filament 322 upstream of the printer head. Hence, the printer nozzle is sometimes (also) indicated as extruder nozzle. Arranging layer 322 by layer 322 and/or layer 322t on layer 322, a 3D item 1 may be formed. Reference 575 indicates the filament providing device, which here amongst others include the spool or roller and the driver wheels, indicated with reference 576.

Reference A indicates a longitudinal axis or filament axis.

Reference C schematically depicts a control system, such as especially a temperature control system configured to control the temperature of the receiver item 550. The control system C may include a heater which is able to heat the receiver item 550 to at least a temperature of 50° C., but especially up to a range of about 350° C., such as at least 200° C.

Alternatively or additionally, in embodiments the receiver plate may also be moveable in one or two directions in the x-y plane (horizontal plane). Further, alternatively or additionally, in embodiments the receiver plate may also be rotatable about z axis (vertical). Hence, the control system may move the receiver plate in one or more of the x-direction, y-direction, and z-direction.

Alternatively, the printer can have a head can also rotate during printing. Such a printer has an advantage that the printed material cannot rotate during printing.

Layers are indicated with reference 322, and have a layer height H and a layer width W.

Note that the 3D printable material is not necessarily provided as filament 320 to the printer head. Further, the filament 320 may also be produced in the 3D printer 500 from pieces of 3D printable material.

Figure 1B:
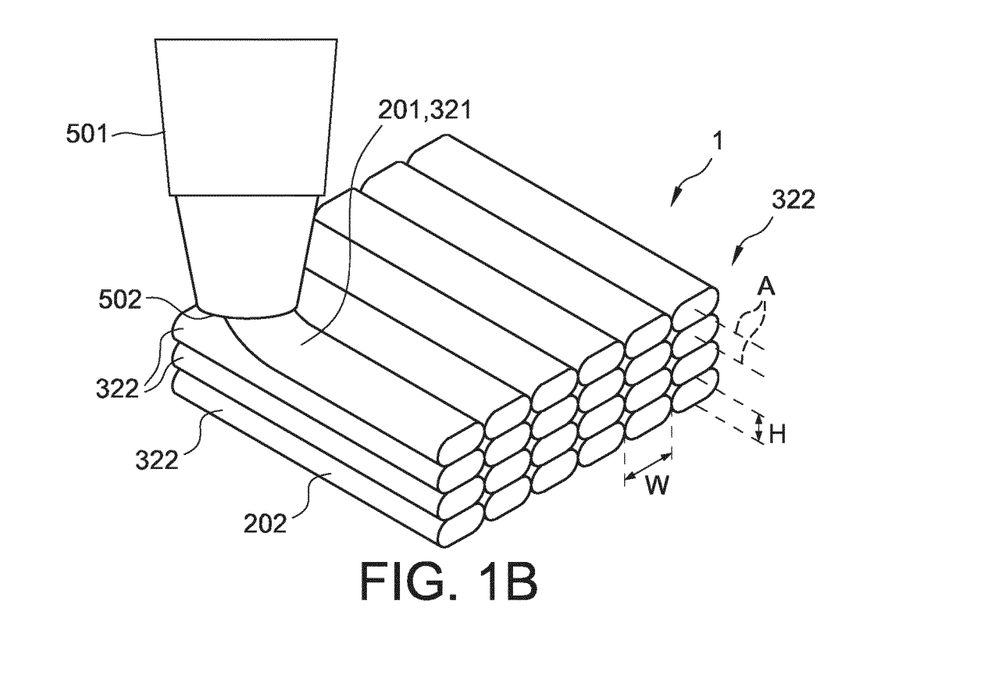

FIG. 1b schematically depicts in 3D in more detail the printing of the 3D item 1 under construction. Here, in this schematic drawing the ends of the filaments 321 in a single plane are not interconnected, though in reality this may in embodiments be the case. Reference H indicates the height of a layer. Layers are indicated with reference 203. Here, the layers have an essentially circular cross-section. Often, however, they may be flattened, such as having an outer shape resembling a flat oval tube or flat oval duct (i.e. a circular shaped bar having a diameter that is compressed to have a smaller height than width, wherein the sides (defining the width) are (still) rounded).

Hence, FIGS. 1a-1b schematically depict some aspects of a fused deposition modeling 3D printer 500, comprising (a) a first printer head 501 comprising a printer nozzle 502, (b) a filament providing device 575 configured to provide a filament 321 comprising 3D printable material 201 to the first printer head 501, and optionally (c) a receiver item 550. In FIGS. 1a-1b, the first or second printable material or the first or second printed material are indicated with the general indications printable material 201 and printed material 202. Directly downstream of the nozzle 502, the filament 321 with 3D printable material becomes, when deposited, layer 322 with 3D printed material 202.

Figure 1C:
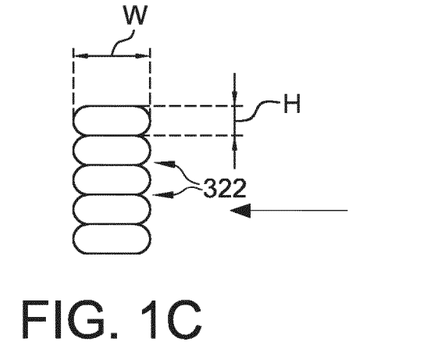

FIG. 1c schematically depicts a stack of 3D printed layers 322, each having a layer height H and a layer width W. Note that in embodiments the layer width and/or layer height may differ for two or more layers 322.

Referring to FIGS. 1a-1c, the filament of 3D printable material that is deposited leads to a layer having a height H (and width W). Depositing layer 322 after layer 322, the 3D item 1 is generated.

Figure 1D:
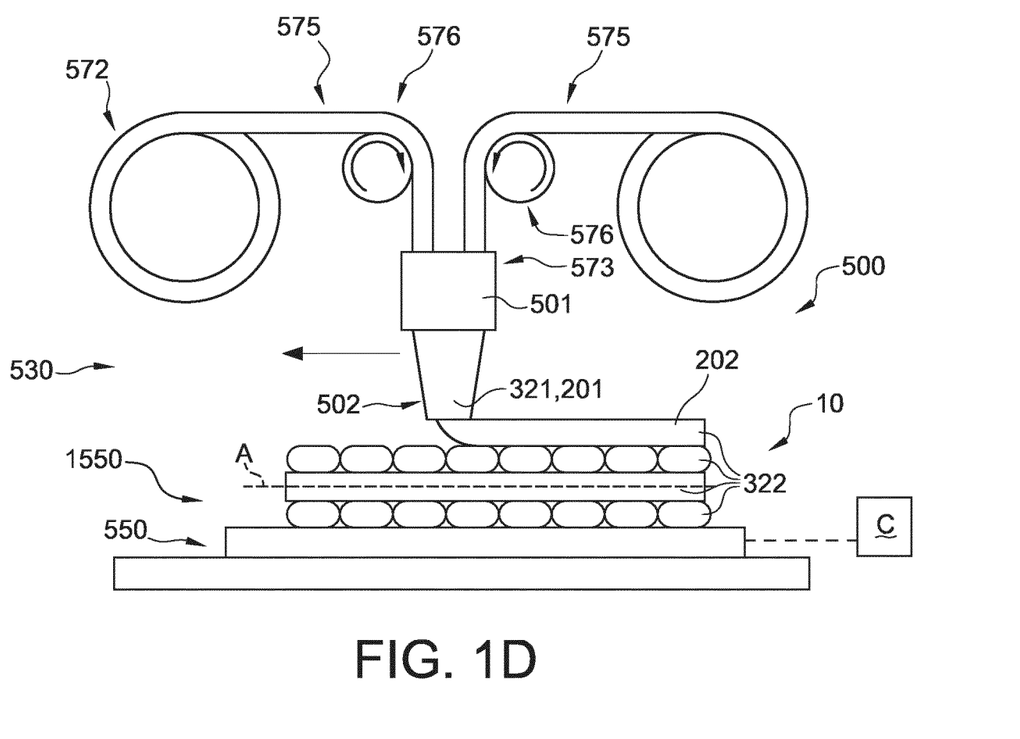

FIG. 1d schematically depicts a fused deposition modeling 3D printer 500 as define herein. A specific embodiment is depicted in FIG. 1c. Here, an embodiment is schematically depicted of the fused deposition modeling 3D printer 500, comprising a printer head 501 comprising a printer nozzle 502 as defined herein and a 3D printable material providing device 575 configured to provide 3D printable material 201 to the printer head 501, wherein the fused deposition modeling 3D printer 500 is configured to provide said 3D printable material 201 to a substrate 1550. Here, the embodiment clearly shows an embodiment wherein the 3D printable material providing device 575 is configured to provide n 3D printable materials 201 to the n distribution elements 510, respectively. In this example, n=2. Note that it may also be possible to provide two or more different 3D printable materials to a single distribution element; this might be done for two or more of the n distribution elements; for the schematically drawings of the distribution elements, see below.

In embodiments, control system C may be configured to control the relative volumes of 3D printable material that enter the combination chamber.

Figure 2A:
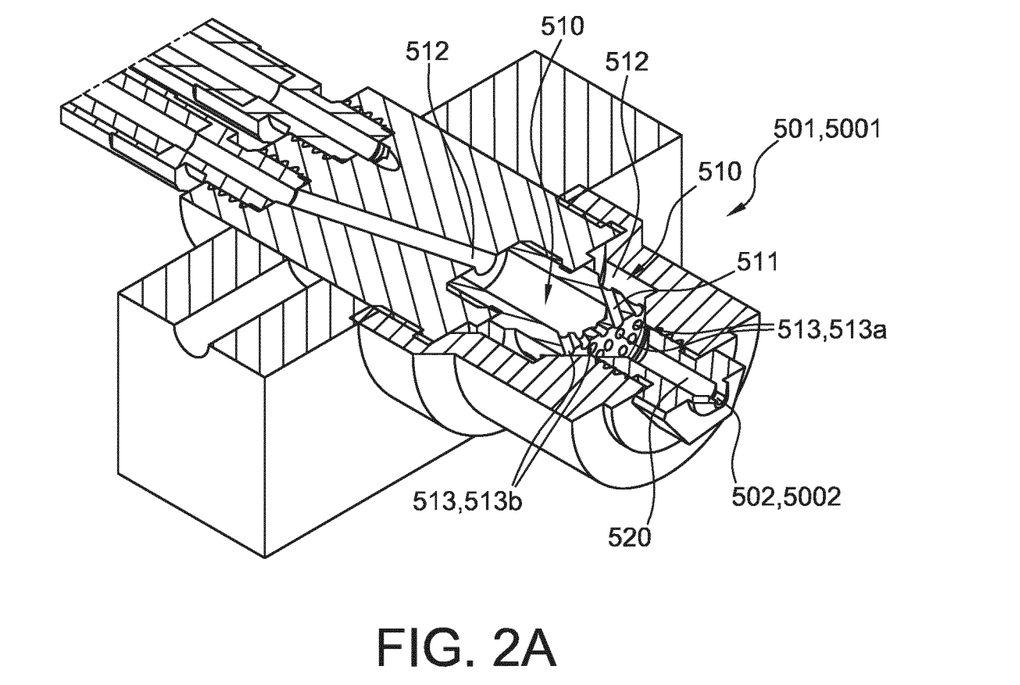
FIGS. 2a-2i show some examples and results.

FIG. 2a schematically depicts an embodiment of a printer head 501 for a 3D printer. Here, a cross-section is shown in perspective. The printer head 501 comprises n distribution elements 510. Here, n=2.

The printer head 501 comprises further a combination chamber 520, and a printer nozzle 502, wherein the combination chamber 520, which is configured downstream of the distribution elements 510 and upstream of the printer nozzle 502.

Each distribution element 510 comprises a flow-through chamber 511 with an inlet 512 (for 3D printable material 201). Further, each flow-through chamber 511 comprises a plurality of k outlets 513 to the combination chamber 520. As schematically shown, the outlets 513 of the distribution elements 510 are configured such that a plurality of outlets 513 of a distribution element 510 have outlets 513 of another distribution element 510 as nearest neighbors. As is also shown, this may apply to a subset of all outlets 513, but not to all. To distinguish the outlets of the different distribution element 510 are indicated with references 513a and 513b.

Note that a distribution chamber may also have more than one inlet 512 (embodiment with a plurality of inlets 512 for a single distribution element is not depicted). For instance, the same or different 3D printable materials may be provided to a single distribution chamber via different inlets 512.

Figure 2B:
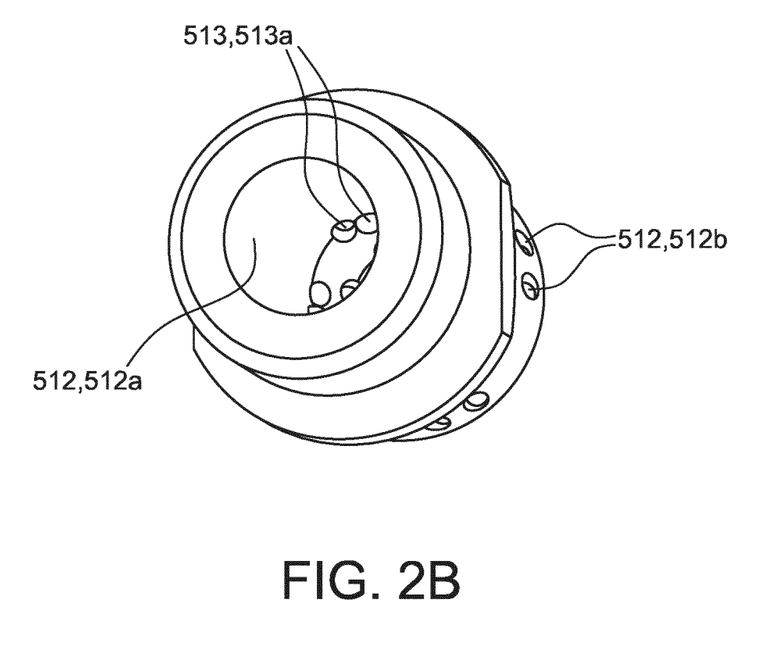
Figures 2C, 2D, 2E:
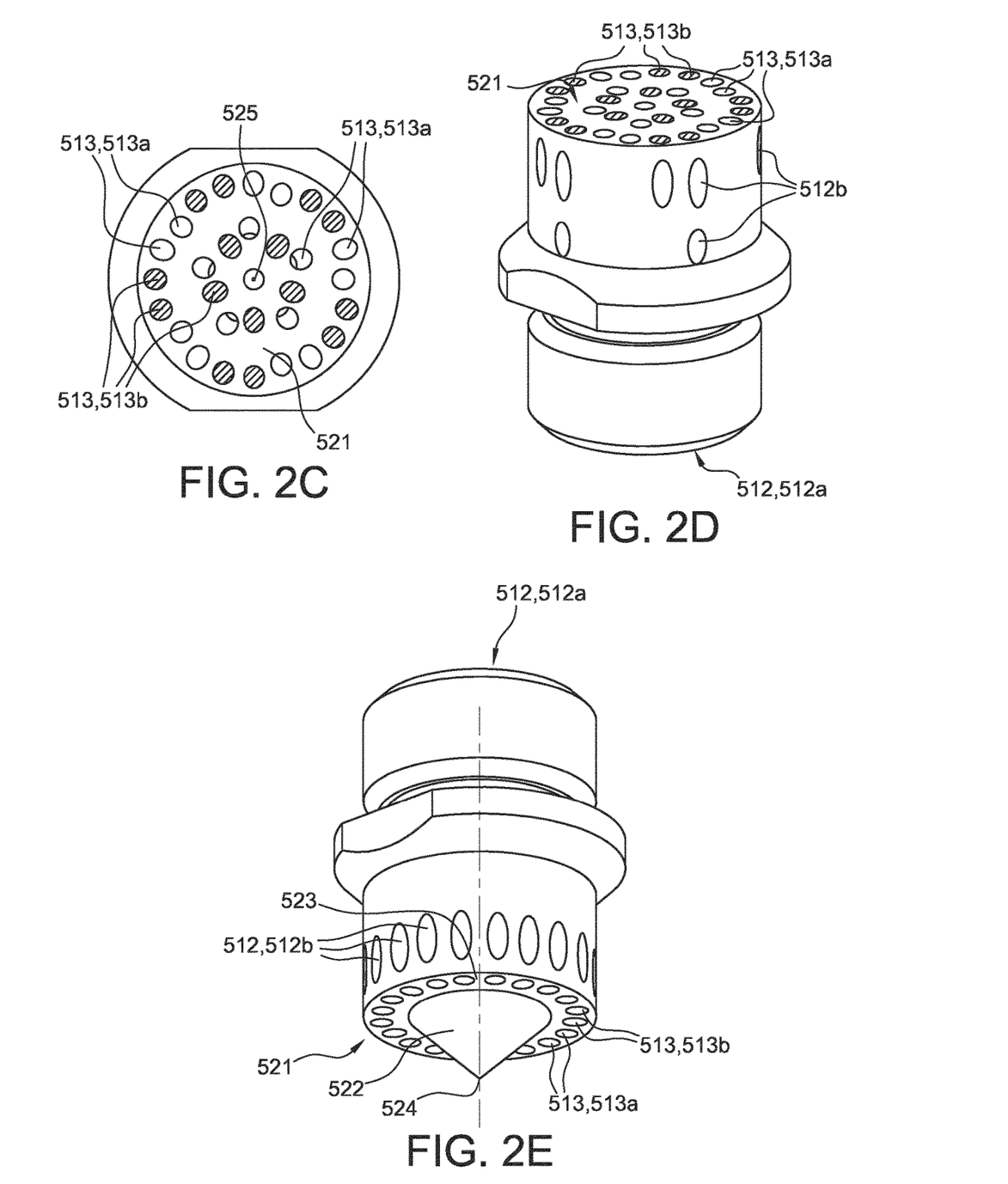
Figure 2F:
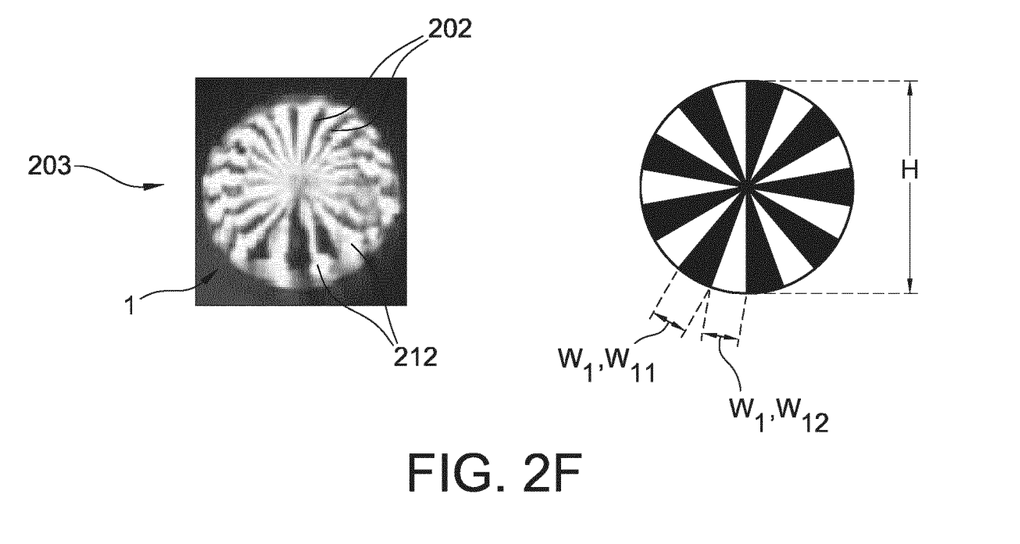
Figure 2G:
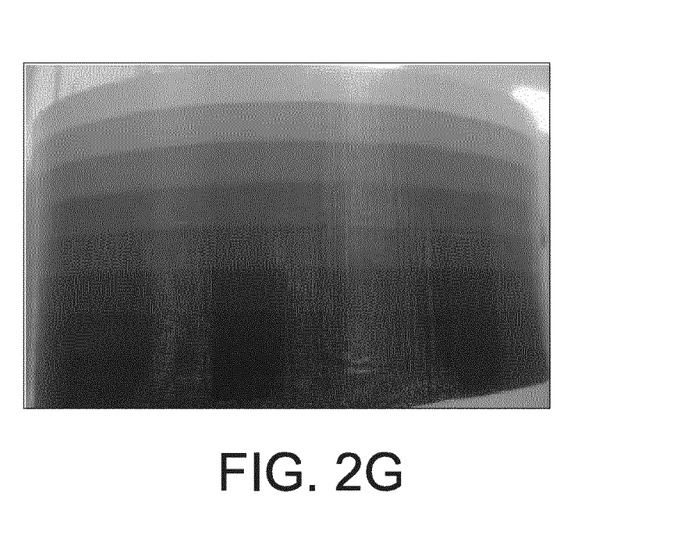
Figure 2H:
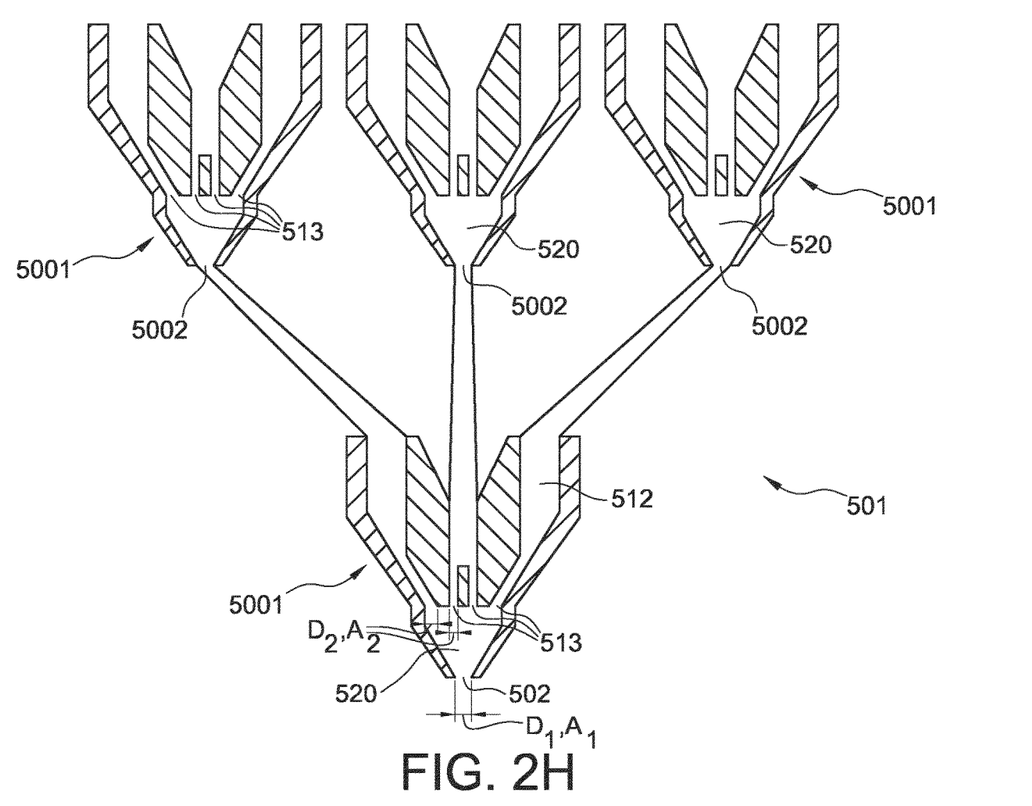

Reference 525 indicates a central part of an outlet area 521 comprising the outlets 513 (see also FIG. 2h).

More in general, FIG. 2a schematically depicts a material combination element 5001 especially suitable for combining (different types of) 3D printable materials, comprising n distribution elements 510, wherein n≥2, a combination chamber 520, and an opening 5002, such as a nozzle, wherein the combination chamber 520 is configured downstream of the distribution elements 510 and upstream of the opening 5002, wherein each distribution element 510 comprise a flow-through chamber 511 with an inlet 512 (for 3D printable material 201) and a plurality of k outlets 513 to the combination chamber 520, wherein k≥4, wherein the outlets 513 of the distribution elements 510 are configured such that a plurality of outlets 513 of a distribution element 510 have outlets 513 of another distribution element 510 as nearest neighbors.

FIG. 2b schematically depicts a top view, in perspective, of the embodiment or a variant thereof of the embodiment schematically depicted in FIG. 2a.

FIGS. 2c and 2d schematically depict a bottom view, as well as a side view, in perspective, respectively, showing embodiments and variants wherein the outlets 513 of the distribution elements 510 are configured regularly distributed over an outlet area 521, wherein the outlet area 521 is configured upstream of at least part of the combination chamber 520. As schematically shown a plurality, here all outlets 513, of a distribution element 510 have outlets 513 of another distribution element 510 as nearest neighbors. This does not exclude that some may also have an outlet of the same distribution element as (other) nearest neighbor.

FIG. 2e schematically depicts another embodiment, wherein the outlets 513 of the n distribution elements 510 are configured regularly distributed over an ellipse-shaped outlet area 521. Here, the outlet area 521 is ring-shaped. Further, this figure also shows an embodiment that further comprises a conically shaped element 522 having a base 523 configured between or upstream of the ellipse-shaped outlet area 521 and an apex 524 directed to the nozzle 502.

FIG. 2 schematically depicts an embodiment wherein the outlets 513 of the n distribution elements 510 are configured regularly distributed about the periphery of a surface or outlet area 521 defined by a circle, oval, or polygonal shaped outlet area 521, here a circle.

FIG. 2f depicts in a photograph an embodiment of 3D item 1, though more precisely this may be a cross-section of a non-decompressed layer 203. The item 1 comprises 3D printed material 202. The 3D item 1 comprising layers of 3D printed material, as schematically shown in FIGS. 1a-1c. The layers 203 especially comprise a first 3D printed material 202, which especially comprises a (first) thermoplastic material. Further, the layers 203 comprise a second 3D printed material 202, which also especially comprises thermoplastic material (second thermoplastic material). The layers further comprise domains 212 of the first or the second thermoplastic material. Actually, both the first 3D printed material and the second 3D printed material are available in domains. The domains 212 of the first and second thermoplastic material are alternately arranged around a longitudinal axis of the layer. The longitudinal axis of the layer is the longitudinal axis or filament axis indicated with reference A in FIG. 1b. At an outer surface of the layer, the domains 212 have a largest width w1 of 200 µm or less. As shown in FIG. 2e it may be arbitrary whether this dimension is indicated as width or height. The cross-sectional length or depth may be about the radius but may also be smaller. The length, i.e. along a perpendicular to the plane of drawing, may be much longer than the largest width w1 which is at maximum 200 µm. Especially, the domains 212 have a largest width w1 which is at maximum 120 µm.

The first thermoplastic material and the second thermoplastic material may be the same or different materials. The domains 212 may have two or more different colors. Together, the domains in the layers may provide an overall (color) impression, averaged over the domains in the layers.

FIG. 2f (right) schematically depicts an embodiment wherein the relative volumes of 3D printable material that entered the combination chamber were essentially the same. The resulting different domains are equally distributed. However, herein also embodiments are described wherein the relative volumes are controlled to vary the properties of the 3D printed material, see e.g. FIG. 2g.

FIG. 2g shows a photograph wherein a nearly stepless transition from one color to another color is shown. This behavior is shown over the entire diameter; this is not possible with prior art FDM methods. FIG. 2f also shows a schematic representation. Here, Above figure is maybe clearer? Here, two (n=2) distribution elements may have been applied, with each 9 (k=9) outlets, leading to 2*9 domains. The width W1 of the domains may be about 200 µm or smaller, such as 120 µm or smaller, like 100 µm or smaller, such as 60 µm or smaller. However, this may depend upon the application. The width of the domains may in principle differ. This is indicated with references w11 and w2.

Hence, especially printing conditions and/or printer conditions are chosen such that w1 is equal to or smaller than 200 µm, such as equal to or smaller than 120 µm, like especially equal to or smaller than 100 µm.

FIG. 2 also shows that the 3D printed material may comprise a plurality of first domains and a plurality of second domains (when using the herein described method and/or printer head with different 3D printable materials).

FIG. 2h schematically depicts an embodiment wherein a plurality of combination elements 5001 may be combined. For instance, at least two combination elements 5001 may be used as feed for a printer head 501, which may in essence also comprise a combination element 5001. Note that the flow-through chamber 520 of printer head or of the most downstream configured combination element may e.g. be configured as a ring. In such embodiment, the left and right part in this schematic drawing may communicate. As here two combination elements 5001 are configured upstream of this flow-through chamber 520 of printer head or of the most downstream configured combination element, there may be a plurality of such flow-through chamber 520, configured around the central flow-through chamber.

Hence, FIG. 2h schematically shows an embodiment of a combination of passive mixing elements. Upstream of the printer head, more precisely upstream of one or more distribution elements, another printer head is configured, which may be used to provide to a distribution element of the downstream printer head 3D printable material that is already a combination of (3D) printable materials. Such configuration may be applied to one or more of the distribution elements of the downstream printer head. Hence, FIG. 2h schematically shows an embodiment of a fused deposition modeling 3D printer 500 comprising two at least two printer heads 501, wherein the printer nozzle 502 of a first printer head 501 is configured upstream of the inlet 512 of a distribution elements 510 of a second printer head 510.

FIG. 2h also shows the equivalent diameter D1 of the nozzle 502, with the nozzle (opening) having an area of A1. Likewise, the outlets 513 have an equivalent diameter D2, with the outlet (opening) having an area A2. The diameters and areas may differ for two or more of the outlets 513, but may also be all the same within the printer head. The squeeze factor SF may be defined as the ((area of all the holes in the mixing chamber)/(area of the nozzle)= (A2*n*k)/(A1), where A2 is the area of a single outlet in the mixing chamber (assuming the area A2 is the same for all outlets).

Figure 2I:
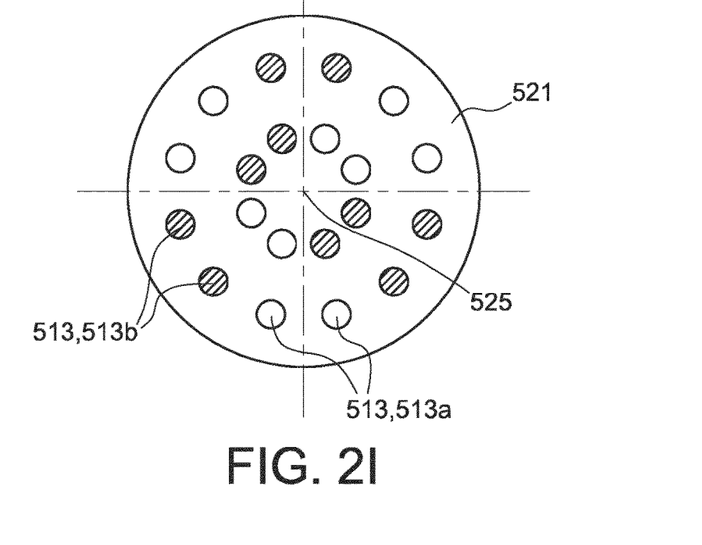

FIG. 2i schematically depicts an outlet area 521, having a central part 525. Especially for a plurality of the outlets 513 configured most remote from the central part 525 applies that a plurality of outlets 513 of a distribution element have outlets 513 of another distribution element as nearest neighbors. Here, again an example with two distribution elements is applied, wherein the different outlets 513 of the different distribution elements are indicated with references 513a and 513b, respectively. With such embodiments, the distribution of the domains such as shown in FIG. 2e may be obtained, see also the embodiment of FIG. 2d, wherein all outlets 513 are alternatingly configured in a ring-shaped outlet area.

The term "substantially" herein, such as "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention also provides a control system that may control the apparatus or device or system, or that may execute the herein described method or process. Yet further, the invention also provides a computer program product, when running on a computer which is functionally coupled to or comprised by the apparatus or device or system, controls one or more controllable elements of such apparatus or device or system.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on $T_g$ or $T_m$ of the material(s).

The invention claimed is:

1. A printer head for an extrusion-based 3D printer, the printer head comprising n distribution elements, wherein n≥2, a combination chamber, and a printer nozzle, wherein the combination chamber is configured downstream of the distribution elements and upstream of the printer nozzle, wherein each distribution element comprises a flow-through chamber with an inlet for a 3D printable material and a plurality of k outlets to the combination chamber, wherein k≥4, each distribution element being arranged to distribute the 3D printable material by the plurality of k outlets, wherein the outlets of the distribution elements are configured such that a plurality of outlets of a distribution element have outlets of another distribution element as nearest neighbors.

2. The printer head according to claim 1, wherein the outlets of the n distribution elements are distributed over an outlet area, wherein the outlet area is configured upstream of at least part of the combination chamber, and wherein at least 90% of the total number of outlets of a distribution element have outlets of another distribution element as nearest neighbors.

3. The printer head according to claim 1, wherein the outlets of the n distribution elements are configured regularly distributed about the periphery of a surface defined by a circle, oval, or polygonal shaped outlet area.

4. The printer head according to claim 3, further comprising a conically shaped element having a base configured between or upstream of the ellipse-shaped outlet area and an apex directed to the nozzle, and wherein one or more of the outlets and the printer nozzle have an equivalent circular diameter of at maximum 2 mm.

5. The printer head according to claim 1, wherein the combination chamber has an average equivalent circular diameter that is larger than an equivalent circular diameter of the printer nozzle.

6. The printer head according to claim 1, wherein, for a given n=number of distribution elements and k=number of outlets per each distribution element the printer nozzle has an equivalent circular diameter of at maximum 200 μm*n*k.

7. An extrusion-based 3D printer, comprising a printer head according to claim 1, and a 3D printable material providing device configured to provide 3D printable material to the printer head.

8. The extrusion-based 3D printer according to claim 7, wherein the 3D printable material providing device is configured to provide n 3D printable materials to the n distribution elements, respectively.

9. The extrusion-based 3D printer according to claim 7, comprising two at least two printer heads, wherein the printer nozzle of a first printer head is configured upstream of the inlet of a distribution elements of a second printer head.

10. The printer head according to claim 1, wherein each of the k outlets of the n distribution elements have equivalent circular diameters selected from the range of about 60-200 .mu.m.

11. A method for 3D printing a 3D item, the method comprising depositing m 3D printable materials to provide the 3D item comprising 3D printed material, wherein m≥2, the method comprising feeding the m 3D printable materials to at least m distribution elements of the printer head according to claim 1, and depositing the 3D printed material.

12. The method according to claim 11, wherein the m 3D printable materials comprise different thermoplastic materials.

13. The method according to claim 11, and wherein the m 3D printable materials are 3D printable materials having different colors.

14. The method according to claim 11, wherein the 3D printed material comprises plurality of domains originating from the m 3D printable materials, wherein the method comprises controlling the dimensions of the domains to have a largest width which is at maximum 120 μm.

* * * * *